(12) United States Patent
Goldfarb et al.

(10) Patent No.: US 10,581,977 B2
(45) Date of Patent: Mar. 3, 2020

(54) COMPUTER SECURITY AND USAGE-ANALYSIS SYSTEM

(71) Applicant: ALTR Solutions, Inc., Satellite Beach, FL (US)

(72) Inventors: Scott Nathaniel Goldfarb, Washington, MI (US); James Douglas Beecham, Mill Valley, CA (US); Christopher Edward Struttmann, Indialantic, FL (US); Gordon Earl Martin, Skokie, IL (US); Peter Reuben Martin, Skokie, IL (US)

(73) Assignee: ALTR Solutions, Inc., Satellite Beach, FL (US)

( * ) Notice: Subject to any disclaimer, the term of this patent is extended or adjusted under 35 U.S.C. 154(b) by 764 days.

(21) Appl. No.: 15/171,347

(22) Filed: Jun. 2, 2016

(65) Prior Publication Data
US 2019/0075168 A1    Mar. 7, 2019

Related U.S. Application Data

(60) Provisional application No. 62/169,823, filed on Jun. 2, 2016.

(51) Int. Cl.
*H04L 29/08* (2006.01)
(52) U.S. Cl.
CPC ............ *H04L 67/141* (2013.01); *H04L 67/02* (2013.01)
(58) Field of Classification Search
CPC . G06F 21/554; G06F 21/552; H04L 63/1425; H04L 63/107; H04L 63/1408
See application file for complete search history.

(56) References Cited

U.S. PATENT DOCUMENTS

| | | | | |
|---|---|---|---|---|
| 8,424,072 B2* | 4/2013 | Pullikottil | ............ | H04L 63/1425 380/232 |
| 9,038,134 B1* | 5/2015 | Ackerman | .............. | H04L 63/08 726/2 |
| 9,185,095 B1* | 11/2015 | Moritz | .................. | H04L 63/102 |
| 9,225,738 B1* | 12/2015 | Chiles | ................ | H04L 63/1425 |
| 9,558,347 B2* | 1/2017 | Chari | ...................... | G06F 21/50 |
| 10,237,298 B1* | 3/2019 | Nguyen | .............. | H04L 63/1441 |
| 2014/0359647 A1 | 12/2014 | Shoemake et al. | | |
| 2014/0365782 A1 | 12/2014 | Beatson et al. | | |
| 2015/0067338 A1 | 3/2015 | Gero et al. | | |
| 2015/0154303 A1 | 6/2015 | Shin et al. | | |
| 2015/0235152 A1* | 8/2015 | Eldardiry | .............. | G06F 21/552 705/7.28 |
| 2015/0295936 A1 | 10/2015 | Wang | | |

(Continued)

*Primary Examiner* — Vivek Srivastava
*Assistant Examiner* — Muhammad Raza
(74) *Attorney, Agent, or Firm* — Pillsbury Winthrop Shaw Pittman LLP

(57) ABSTRACT

Provided is a private and secure network that uses an authentication mechanism with a uniquely assigned private IP address and network credentials issued as part of a VPN certificate exchange. A first layer of authentication establishes a secure tunnel between user and VPN server, and a second layer of authentication connects that secure tunnel to the web site or resource, without passing the VPN certificate. Once authenticated, interaction between website or resource and user are automatically monitored for abnormal or malicious behavior and, if required, automatic verification and authentication response is generated.

20 Claims, 16 Drawing Sheets

(56) References Cited

U.S. PATENT DOCUMENTS

| | | |
|---|---|---|
| 2016/0028621 A1 | 1/2016 | Gao |
| 2016/0094458 A1 | 3/2016 | Bostick et al. |
| 2016/0112397 A1* | 4/2016 | Mankovskii .......... H04L 63/105 726/6 |
| 2016/0142374 A1 | 5/2016 | Clark |
| 2016/0142774 A1 | 5/2016 | Sayyadi-harikandehei |
| 2016/0154565 A1 | 6/2016 | Harjula et al. |
| 2016/0156592 A1 | 6/2016 | Walters et al. |

* cited by examiner

| field | Type | Null | Key | Default | Extra |
|---|---|---|---|---|---|
| radacctid | bigint(21) | NO | PRI | NULL | auto_increment |
| acctsessionid | varchar(64) | NO | MUL | NULL | |
| acctuniqueid | varchar(32) | NO | UNI | NULL | |
| username | varchar(64) | NO | MUL | NULL | |
| groupname | varchar(64) | YES | | NULL | |
| realm | varchar(64) | NO | MUL | NULL | |
| nasipaddress | varchar(15) | YES | | NULL | |
| nasportid | varchar(15) | YES | | NULL | |
| nasporttype | varchar(32) | YES | MUL | NULL | |
| acctstarttime | datetime | YES | | NULL | |
| acctupdatetime | datetime | YES | | NULL | |
| acctstoptime | datetime | YES | MUL | NULL | |
| acctinterval | int(12) unsigned | YES | MUL | NULL | |
| acctsessiontime | int(12) unsigned | YES | MUL | NULL | |
| acctauthentic | varchar(32) | YES | | NULL | |
| connectinfo_start | varchar(50) | YES | | NULL | |
| connectinfo_stop | varchar(50) | YES | | NULL | |
| acctinputoctets | bigint(20) | NO | | NULL | |
| acctoutputoctets | bigint(20) | NO | | NULL | |
| calledstationid | varchar(50) | YES | | NULL | |
| callingstationid | varchar(50) | NO | | NULL | |
| acctterminatecause | varchar(32) | NO | | NULL | |
| servicetype | varchar(32) | YES | | NULL | |
| framedprotocol | varchar(32) | YES | | NULL | |
| framedipaddress | varchar(15) | NO | MUL | NULL | |

Fig. 3

| username | callingstationid | framedipaddress | acctstarttime |
|---|---|---|---|
| chris | 71.43.131.202 | 10.99.1.42 | 2015-02-24 20:09:52 |
| james | 71.43.131.202 | 10.99.1.54 | 2015-02-24 23:22:42 |
| chris | 71.43.131.202 | 10.99.1.58 | 2015-02-24 23:29:58 |
| chris | 71.43.131.202 | 10.99.1.58 | 2015-02-24 23:31:14 |
| chris | 71.43.131.202 | 10.99.1.62 | 2015-02-24 23:35:57 |
| chris | 71.43.131.202 | 10.99.1.66 | 2015-02-24 23:42:20 |
| gordo | 24.136.14.66 | 10.99.1.30 | 2015-02-24 18:00:02 |
| gordo | 24.136.14.66 | 10.99.1.30 | 2015-02-25 13:07:53 |
| gordo | 24.136.14.66 | 10.99.1.30 | 2015-02-25 13:48:54 |
| pete | 98.209.12.106 | 10.99.1.34 | 2015-02-25 15:13:09 |
| chris | 71.43.131.202 | 10.99.1.66 | 2015-02-25 17:17:20 |
| alpha13 | 24.136.14.66 | 10.99.0.18 | 2015-02-25 18:22:33 |
| alpha13 | 24.136.14.66 | 10.99.0.54 | 2015-02-25 18:22:42 |
| james-test | 76.21.116.118 | 10.99.0.26 | 2015-02-25 19:09:14 |

Fig. 4

```
[root@ovpnvm1 ~]# iptables -t nat -L
Chain PREROUTING (policy ACCEPT)
target     prot opt source               destination
REDIRECT   tcp  --  anywhere             anywhere             tcp dpt:http redir ports 3128

Chain INPUT (policy ACCEPT)
target     prot opt source               destination Chain OUTPUT (policy ACCEPT)
target     prot opt source               destination Chain POSTROUTING (policy ACCEPT)
target     prot opt source               destination
MASQUERADE all  --  10.99.0.0/24         anywhere
MASQUERADE all  --  10.99.1.0/24         anywhere
[root@ovpnvm1 ~]#
```

Fig. 5

Headers sent by your browser

| | |
|---|---|
| Host | www.procato.com |
| User-Agent | Mozilla/5.0 (X11; Linux x86_64) AppleWebKit/537.36 (KHTML, like Gecko) Chrome/41.0.2272.89 Safari/537.36 |
| Accept | */* |
| Referer | http://www.procato.com/my+headers/ |
| Accept-Encoding | gzip, deflate, sdch |
| Accept-Language | en-US,en;q=0.8 |
| Via | 1.1 ovpnvm1.gait.internal (squid/3.5.1) |
| X-Forwarded-For | 10.99.1.70 |
| Cache-Control | max-age=259200 |
| Connection | keep-alive |

Fig. 6

COMPUTER SECURITY AND USAGE-ANALYSIS SYSTEM

CROSS-REFERENCE TO RELATED APPLICATIONS

This patent claims the benefit of U.S. Provisional Patent Application 62/169,823, titled "Private and Secure Authentication via a Computer Network, both the Public Internet or Private Intranet Without Passing Personal Identifying Information that Detects and Responds to Intruders and or Malicious Behavior," filed 2 Jun. 2015. The entire content of the earlier-filed application is hereby incorporated by reference.

BACKGROUND

1. Field

The present disclosure relates generally to security for networked computers.

2. Description of the Related Art

The internet is a dangerous place. Unless a user is continually vigilant—and sometimes even when the user is vigilant—anonymous users and hackers can steal and track a user's information without the user's knowledge. The concern is widespread and well founded. Every day businesses are hacked without their knowledge. Sometimes these invasions can persist for months before being discovered. By then thousands or millions of dollars of information may have been compromised or looted. Personal computers, smart appliances, smartphones, and Internet-connected game machines have become threat vectors. In short, no one is safe. It is in view of this reality that the disclosed technology was developed.

SUMMARY

The following is a non-exhaustive listing of some aspects of the present techniques. These and other aspects are described in the following disclosure.

Some aspects include a private and secure network that uses an authentication mechanism with a uniquely assigned private IP address and network credentials issued as part of a VPN certificate exchange. A first layer of authentication establishes a secure tunnel between user and VPN server, and a second layer of authentication connects that secure tunnel to the web site or resource, without passing the VPN certificate. Once authenticated, interaction between website or resource and user are automatically monitored for abnormal or malicious behavior and, if required, automatic verification and authentication response is generated.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements:

FIG. 3 is a data structure diagram, providing examples of data maintained by the data store of the network access system;

FIG. 4 is a data diagram providing examples of how the system maintains records of each client's username, public IP address, framed IP address and other information;

FIG. 5 is a routing table diagram useful in understanding how the proxy server is configured in some embodiments;

FIG. 6 is a header diagram, providing an example of the information placed into the message header sent by the user's browser application in some embodiments;

DETAILED DESCRIPTION OF CERTAIN EMBODIMENTS

Figure 1:
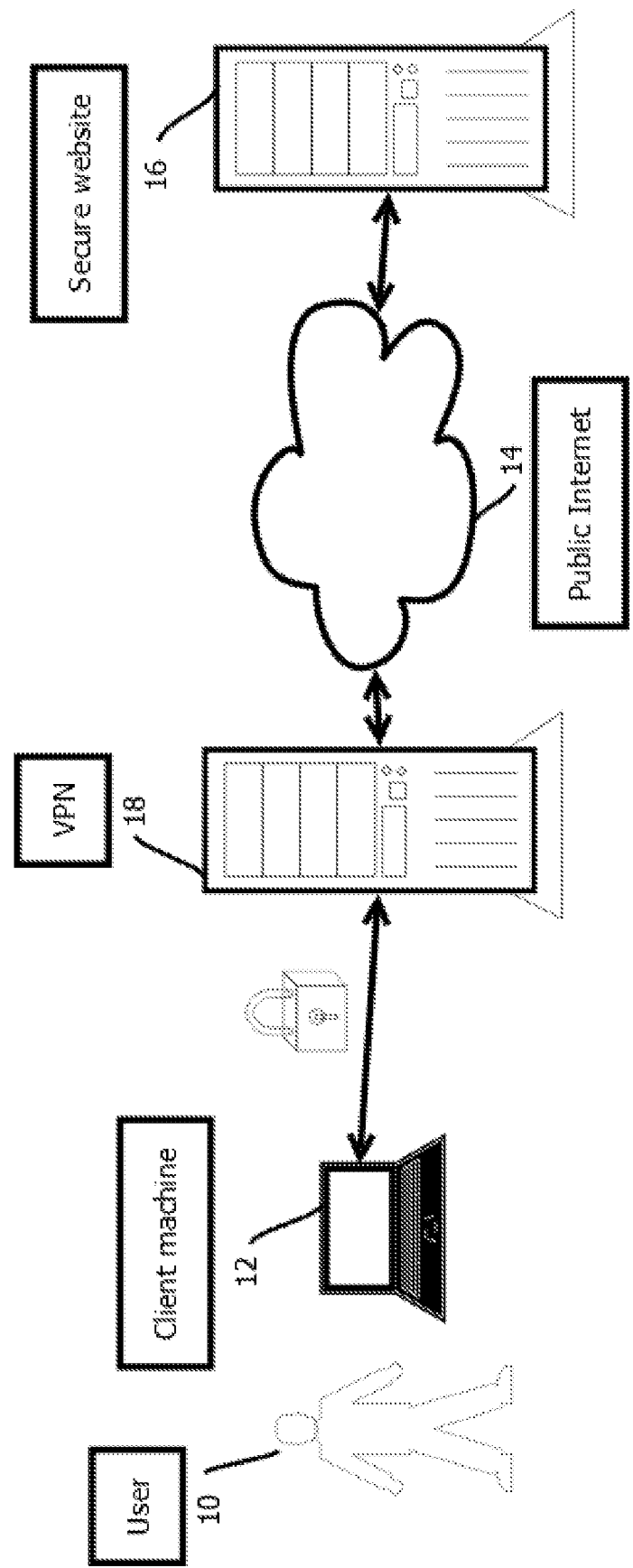
FIG. 1 is a schematic overview of an example secure network access system.

To mitigate the problems described herein, the inventors had to both invent solutions and, in some cases just as importantly, recognize problems overlooked (or not yet foreseen) by others in the field of cyber security. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Some embodiments include a secure internet-based access system. The system, in some embodiments, forms a private web "village," in some cases, with private and secure user authentication and interconnection. Some embodiments create private network connections for both enterprise intranets (e.g., websites and other network-accessible resources) to facilitate communication among user groups, such as those seeking privacy, like various interest groups, in some cases regardless of geo-location. Using some embodiments, people with a common interest are able to connect and communicate with other users in a safe and secure way.

Some embodiments may execute a zero-password, zero-username authentication process for at least some sessions (or all or substantially all user sessions). The process, in some embodiments, is expected to benefit special interest groups, corporate users, or similar purposed users who wish to communicate over the public internet or a private intranet in a private and controlled manner.

Some embodiments may control user access and filter user behavior on private sites or resources, e.g., not just from a connection standpoint (meaning this user has access to this page, or that user cannot access this resource). Some embodiments may police and control a user's access based upon the user's actions within the network. Some embodiments may monitor various factors, ranging from language used to browsing habits, and based on this data, infer whether the user is permitted to have access to network resources. Further, some embodiments, may infer whether a user is engaging in actions that may harm the "village," corporation, or group. Additionally, some embodiments may analyze a user's likes and dislikes based on direct (or indirect) user feedback to build a profile. These interactions are often unique to each user and allow some embodiments to accurately and uniquely connect users to products in a relatively specific way.

Some embodiments may include a component referred to as private auto-login system (PALS), which may provide security on any one of a network of sites or resources administered by the disclosed system. Some embodiments may also include a component referred to as the transparent user neural aggregator (TUNA) system (which may include non-neural-net probabilistic architectures as well as neural-net implementations), which in some embodiments may determine whether a user's digital behaviors are non-standard relative to the user's known habits. TUNA is expected to have a number of uses, such as tailoring content and advertisements to a user, and determining the likelihood that a user's computing device has been compromised. By profiling what a user likes and dislikes, how the user operates in a digital landscape, and distinct behaviors of interacting with a computing device, some embodiments may determine whether a series of actions fits into that person's profile and detect imposters.

Some embodiments may include a component referred to as "autonomous malicious behavioral recognition system" (AMBR). Some embodiments of AMBR may use machine learning and data aggregation to further protect users inside the network or "village." The AMBR system may include a user data aggregation and analysis framework (or library, or application), which is expected to facilitate secure internet access, in real-time, and defense of users of a community online. Some implementations of AMBR are expected to curb abusive online behavior, such as 'flaming' and 'trolling,' which have damaged many public online communities.

Some embodiments may provide a platform where those types of behaviors are not only disallowed but are automatically detected, removing (or reducing) the need for human administrators, and allowing the system to place offending users in a suspended state requiring additional authorization to continue participating on the platform. This additional authorization is, in some embodiments, dynamic in its implementation and may include a short message service (SMS) message or email to a user's address with the network or such a message to a 'village' administrator.

As shown in FIG. 1, the secure internet access system may be accessed by an exemplary user 10 operating a personal computer, or other suitable device such as a tablet computer, on-line game machine or smart phone (referred to generally as the client machine 12). While the user is able to access conventional websites on the internet in the usual way in some use cases, some embodiments allows the user to access a private, secure website 16 by communicating through a VPN 18. Communications may occur over a network, such as the public internet 14.

Some embodiments may be configured to effect secure authentication and communication, e.g., with the website 16 via the VPN 18. To this end, as noted, some embodiments may include a system referred to as the "privacy auto-login system" (PALS). Some embodiments may also be configured to detect malicious user behavior. To this end, as noted, some embodiments may include a system referred to as the "autonomous malicious behavioral recognition" system (AMBR). Further, some embodiments may be configured to assess and identify non-standard usage patterns of users who interact with the system, e.g., via the above-noted TUNA component. This TUNA component is also expected to be capable of targeting messages, including advertisements.

Figure 2:
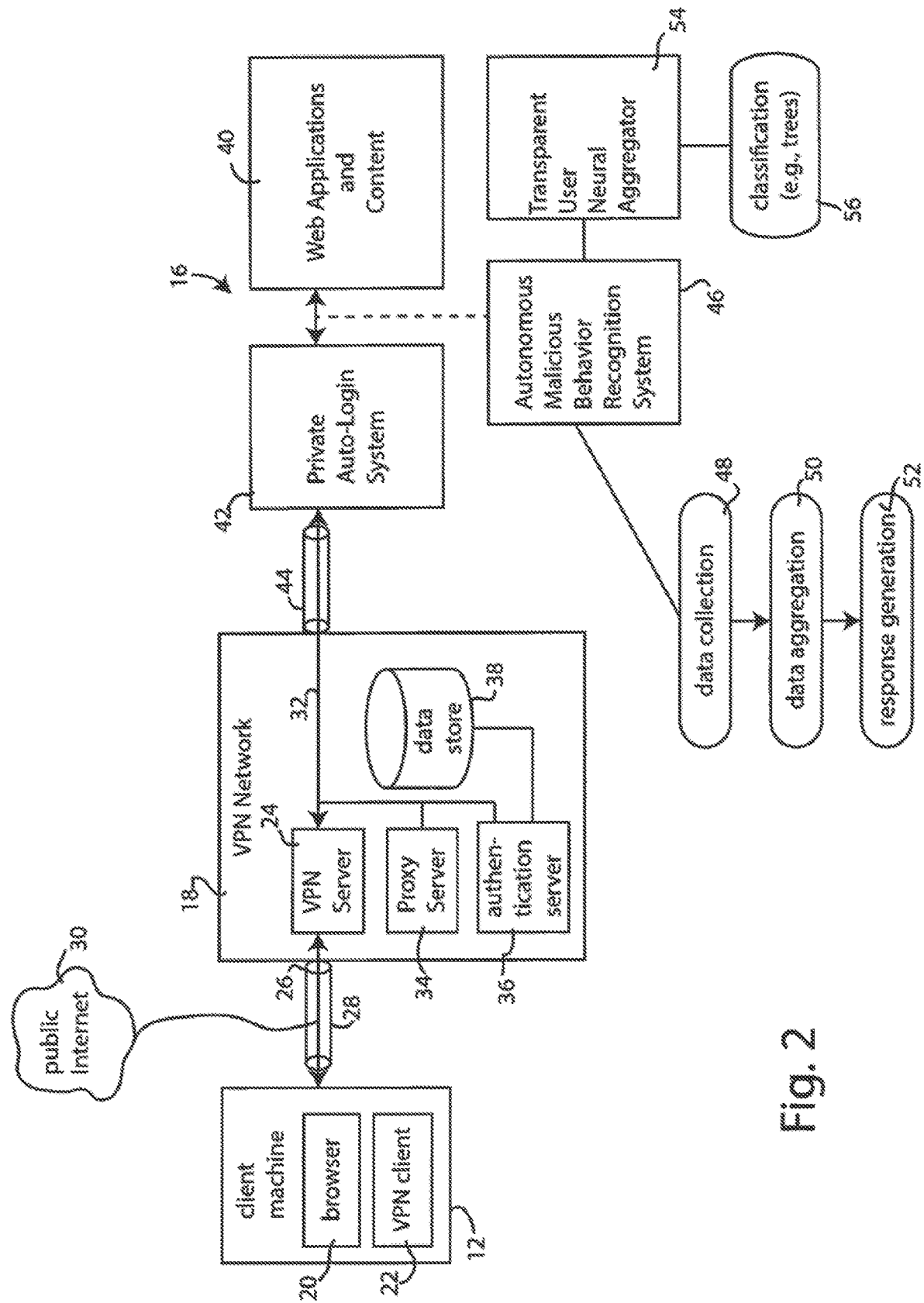
FIG. 2 is a block diagram of one embodiment of the secure network access system.

FIG. 2 depicts the logical architecture of an embodiment of the secure network access system. FIG. 2 shows in greater detail user client machine 12, VPN 18, and private secure website 16 (which may also include various other resources useful in other applications beyond web sites).

The client machine 12 may be a personal computer or other computing device, such as a tablet computer, on-line game machine, smart phone, or the like. The client machine 12 may be programmed with computer executable instructions stored within its memory to perform a web browser application 20 and a VPN client application 22. The web browser application 20 may be configured to display and interact with websites using, for example, the hypertext transport protocol (HTTP). The VPN client application 22 may be configured to interact with a counterpart VPN server to establish a secure, encrypted communication channel 28 over a network, such as the public internet 30. In some embodiments, the counterpart to the VPN client application 22 is the VPN server 24, which may be a component of the VPN 18. The VPN 18 may implement a private TCP/IP network 32 and the VPN server may be a computer that has an assigned IP address on the VPN's private TCP/IP network. The VPN server may also communicate with a suitable router 26 that provides connectivity between the VPN server 24 and the public internet 30.

In addition to the VPN server, the VPN may also include a proxy server 34, an authentication server 36, and a data store (e.g., arrangements of data on one or more non-transitory computer readable media) 38. These additional components may authenticate and secure communication between users of the VPN.

The website 16 (e.g., a server and collection of resources operative to serve a private, secure website, ftp site, or the like) may include another component of the system. In some embodiments, the website stores and intermediates web applications and content 40, such that a user can interact with the content using the browser 20 on the client machine. However, unlike some websites, the website 16 may be locked down using a security mechanism (and in some cases, several security mechanisms). One of these security mechanisms may be the private auto-login system (PALS) 42. The PALS may be a computer-implemented service (e.g., one or more processes executing on one or more computers) that interacts with the VPN 18 via a channel 44 (such as a secure channel), which in some cases gives PALS access to information stored within the data store 38. PALS may also be used during authentication of a user before permitting the user to interact with the website 16 and content 40.

PALS 42 may be implemented as a standalone computer system, such as a computer system hosting an application program interface (API) with which various other computer systems may communicate. PALS 42 may provide private auto-login services to a variety of other computer systems. One use of the PALS computer system is that of a secure front end to the web applications and content server 40. If desired, the PALS computer system can be part of the same local network as the web applications and content server 40, although in other embodiments the PALS computer system can be on a separate network; in some such embodiments the server making use of PALS services may access the PALS computer system through a PALS API.

Some embodiments may include an autonomous malicious behavior recognition system (AMBR) 46. AMBR may monitor user interaction with web applications and digital resources to detect malicious or inappropriate user behavior and to take appropriate action. As shown diagrammatically, AMBR 46, in some cases, may execute (among others) three algorithms: a data collection algorithm 48 that captures and stores types of data (e.g., predefined data or dynamically defined data) as data is created during a session between a user and the website 16 and content 40. For example, a predefined data type might include use of foul language. In some embodiments, each time the user places foul language in the interactive data stream, the data collection algorithm may store attributes of that event in non-transitory memory administered by AMBR. These attributes may include, for example, identifier of the user, data and time the event occurred. In some embodiments, such data collection is expected to serve as a measure of whether the user (even a properly authenticated one) is behaving in a manner deemed inappropriate to other members of the "village," or collection users sharing a networked collection of computing devices and seeking to control out-of-group access to the network or resources accessible on the network.

In another example, the data type may include events where the user visits hyperlinked locations within web applications and content that are not regularly accessed by that user, or where the user accesses application features that are not regularly accessed by that user. The AMBR computer system may detect and store these events, with attributes including, for example, an identifier of the user, data, and time the event occurred. In some embodiments, such data collection is expected to serve as a measure of whether the user may be an impostor who has managed to gain access to the "village" by stealing an authorized user's computer, for example. For example, if the account of a ten year old cub scout is discovered attempting to change configuration files that define the parameters of a "village" to which that child does not belong, this would be an indication that the "cub scout" may be an impostor.

AMBR 46 may include a second algorithm that performs data aggregation 50, e.g., by manipulating the data stored by the data collection algorithm 48. In some embodiments, the data aggregation algorithm analyzes data stored by the data collection algorithm and computes aggregate data indicative of malicious or inappropriate behavior. By way of example, the data aggregation algorithm 50 may read the "foul language" data store of a particular user and calculate the cumulative number of foul language infractions during a monitoring duration (e.g., a period, such as a predefined period). This cumulative number is expected to give a better picture of whether a user's inappropriate language was a singular event, or whether it represents chronic behavior. While the data aggregation algorithm can operate on data collected for a particular user, it can also operate to generate aggregate data for a group of users. Thus, if desired, the data store of particular language of a group of users can be accessed and the overall group behavior may be calculated. In some cases, responsive to detecting failing group behavior, groups may be banned or warned via electronic message.

AMBR 46 may implement a third algorithm that performs response generation 52. This third algorithm, in some embodiments, takes one or more collected data and aggregated data into account and programmatically selects the appropriate response based on those input data. Generated responses can range from admonishing a user for exhibiting inappropriate behavior to blocking that user from further access to the web applications and content 40.

In some embodiments, AMBR 46 operates in conjunction with a TUNA system 54 that performs relatively sophisticated pattern recognition algorithms to detect and classify behavioral patterns. In some embodiments, the TUNA system executes classification models 56, such as classification trees to categorize user behavior. The TUNA system can thus be applied in analyzing user behavior, as monitored by AMBR. In addition, the TUNA system can also be applied in analyzing content 40, as a mechanism for matching content to a user's interests, e.g., in an optimal or improved way.

Some embodiments may include the above-noted PALS component 54. In some embodiments, PALS may automatically authenticate (e.g., log-in) users to an internal or external facing web resource using their Virtual Private Network (VPN) client certificates as the authentication mechanism (e.g., as one of the mechanisms or as the sole mechanism). PALS is best understood in view of the configuration and setup procedures to implement the automatic authentication. In some embodiments, PALS is able to log someone into a suitably configured website (such as website 16 (FIG. 2) without the user providing a username and password to the end web resource or web site. Further, in some cases, PALS may authenticate the user without the user engaging in an OAuth routine and providing a username and password to a third party service.

In some embodiments, PALS 42 may include four components. These server side and client software processes may include or be part of a mechanism that allows a PALS-compliant computer to function properly. The following is an example, but as is the case with the other examples herein, other embodiments are possible.

In some embodiments the VPN 18 and VPN server 24 may allow users regardless of geo-location to connect onto a single network (or some embodiments may impose geo-location criteria as a condition to access). Some embodiments of this VPN system, and the associated proxy server 34, may act as a proxy for a user computer's internet connection, e.g., forwarding all (or some) requests from the client machine 12 to the VPN server 24, and the VPN server may then send the response back to the client machine (e.g., passing through content from third party websites or other servers, concealing the VPN address of the client, and public IP address of the client, from the third party server). In some embodiments, the traffic flowing between a user computer (client machine 12) and the VPN server 24 (e.g., all of the traffic) is encrypted using a suitable encryption protocol, such as AES-128-CBC, AES-256, or the like. This secure channel is expected to protect the user's traffic from anyone sitting in-between the user and the user's desired destination. This process is best understood in view of an example of its setup procedures.

The VPN 18 of some embodiments is based upon the open-source version of OpenVPN Access Server, running on a virtual CentOS 7 machine. The VPN server may be configured as a routed VPN and may or may not alter the domain-name system (DNS) entries of a client machine. The VPN server may be configured to not require a user supplied username or password to access the server. In some embodiments, the VPN server may be configured to instead use a combination of client/server certificates that are unique to each client/server and automatically push the client certificate's common name (CN) as the username to the VPN server. This is expected to allow one connection per client as well as be the basis for accessing the user's account (though other embodiments may permit more connections per client or use other bases for accessing user accounts). In some embodiments, the PALS system may also create user groups by which one user may be associated with multiple devices, allowing for cross device authentication and targeted marketing.

Additional configuration of the VPN server may provide tracking and accounting to monitor and identify each user on the system. In some embodiments, the network accounting system provides data logging and user tracking on the network. In some embodiments, the VPN server is configured to send authentication and accounting statistics to a separate, virtual, Radius server, which may then use a MariaDB database as data store 38, to store and process VPN data. Examples of such data are shown in FIG. 3 and may include but are not limited to (which is not to imply that any other described feature is limiting), the username, client public IP address, client internal IP address, connection time, number of bytes sent, number of bytes received, and in some cases, other connection specific parameters. Additionally, the network accounting system may receive authentication requests from the VPN server, determine whether to permit a connection, and responds with a 'yes' or 'no' answer, telling the VPN server whether to allow that client to connect. In some embodiments, the network accounting system uses, among other things, the CN of the client and their public IP address to determine this yes/no answer. FIGS. 2 and 3 depict an example of VPN specific network accounting system data.

In some cases, the VPN server may be configured to forward network traffic (e.g., all traffic) leaving the tunnel interface on port 80 to enter a transparent proxy listening on some arbitrary port. In some embodiments, the proxy used in the stack is the Squid proxy, configured as a transparent proxy in order to prevent any client side configurations. In some embodiments, the transparent proxy may be running on the same computer as the VPN server so that internal tunnel IP address can be seen by the proxy. In such implementations, this allows a lookup at the web server level to match an internal IP address to a VPN client CN.

The VPN client 22 (e.g., running on the client machine) may connect to the VPN server 24. The VPN client may run on a user's client machine and may be responsible for connecting and communicating with the VPN server for various types of network communication (e.g., all network communication). Additionally, in some embodiments, the VPN client receives and responds to requests during the authentication process. The VPN client may intercept network requests that the user makes on their machine, such as website requests or email-related exchanges, and encrypt those requests using the provided AES key. The VPN client may re-route the request to the VPN server. In some cases, the VPN client may include a few server-specific items for connection and transmission. Each VPN client may be given a configuration file that includes the VPN server connection information, a set of VPN server/client unique certificates for use in establishing a secure connection, and an encryption key that the client uses when sending or receiving data to or from the VPN server. Each set of VPN server/client certificates may contain a VPN server certificate that was generated on the VPN server the client is attempting to access. The VPN server certificate may be unique to each VPN server and may serve as the basis for creating the unique client certificate that completes the server/client certificate pair. The client certificate may be created in the same way that an SSL (or TLS) certificate or SSH private key is created and may be unique to each machine that created it, making likely a very minimal amount collisions across the possible set of created certificates. In some embodiments, these uniquely created certificates are then stored securely on the VPN server. Once a client is requesting to download their VPN client software, in some embodiments, a process requests and receives the client certificate from the VPN server (e.g., without user intervention), adds the certificate to the VPN client executable, and places the client on a public facing, SSL secured, website for download.

Upon first running on a user's client machine, the VPN client of some embodiments may register itself with the VPN authentication server. During normal operation, some such VPN clients may respond to authentication checks with unique, machine specific information. The VPN client may communicate back to the PALS system using an AES-encryption client-unique keys and a rotating initialization vector. The parameters of the cryptography function (e.g., AES) may be redefined at various times from the PALS server via a secure channel in some implementations. Additionally, the system may detect duplicate connection attempts as well as connections from areas that are anomalous to the user based upon their connecting IP address and prevent access for those connections.

Finally, the VPN client may be configured to use client certificates, pass the common name of the client certificate as the username to the server, and may be configured to alter DNS settings. Other embodiments may have other configurations, which is not to imply that any other feature may not be omitted or varied in some embodiments.

In some embodiments, the proxy server facilitates certain PALS operations and, in some cases, provides users a better (e.g., lower latency and more reliable) browsing experience by caching web content. The proxy server may run in transparent mode, e.g., to avoid the need for making any client side changes for the proxy to work correctly. In some embodiments, the VPN server runs on the same computer (e.g., sharing an operating system and system memory address space) as the proxy server, and an entry in the computer's routing table may be made to forward outgoing traffic on port 80 to be redirected to the proxy port.

Additionally, the proxy server, in some embodiments, may be configured to insert a header entry for HTTP traffic destined to a defined set of domains (e.g., domains specified with a regex or having a designated suffice, like ".privicee.com" domains). This part is beneficial to some PALS functions and assists with use of a proxy system to implement automatic authentication. In some cases, some or all traffic going to a private, secure web server is manipulated by placing the user's internal IP address into the header field of the request (e.g., an application layer request, like an HTTP request or file transfer protocol (FTP) request). This IP address may be different from IP addresses indicating the sender in lower layer protocols, like in the network and routing layers, in some cases. This process is one contemplated way by which an outside web resource may have an indication of, or see exactly, what goes on inside the VPN server. In some cases, the web server may maintain a lookup table that maps different embedded IP addresses to sessions, and based on parsed header values and the lookup table, the web server may map incoming request (e.g., all from the same IP address of the VPN server) to different sessions of different client devices.

In some embodiments, the web server may be a private, secure web server. The web server may be configured to use client sessions with a client side cookie for user storage. Moreover, in the case of multiple web servers in a load-balanced system, the web servers may all use a central database storage system in order to share user information across the different machines, e.g., session state. Without the central database session storage, the below described HTTPS→HTTP→HTTPS redirect system could potentially hit different web servers, each with a different copy of the user's session data. Or some embodiments may use stateless servers, and session state may be maintained entirely client side, e.g., in parameters passed via URLs and in Local Storage objects or a SQLite database accessible to the client browser.

In order to have the transparent proxy manipulate requests to a secure socket layer (SSL) (or TLS or SSH) secured resource, a variety of techniques may be used, e.g., some embodiments may define an HTTP route to the web services. Some embodiments may form a secure web connection (e.g., SSL/TLS), which passes traffic over a port that is not inspected by the proxy server. In order to get a user's request to pass over port 80, some embodiments may issue a series of redirects from any HTTPS path to a specifically created HTTP route, then back to the originating HTTPS request. This HTTPS→HTTP→HTTPS action allows an external web resource to see the proxy inserted header value of the private IP address, in some embodiments. In some cases, information may pass through serial paths, undergoing various transformations, such as encryption, de-encryption, augmentation, and re-encryption. In some cases, the various paths may extend through distinct networks, e.g., collections of interconnected computing devices having a network address space specific to each network, and some embodiments may translate between these address spaces.

When an HTTPS request is made, and certain criteria are met, the web server may make a GET request to a predefined (or dynamically defined) HTTP route (e.g., either defined through a separate non-SSL web server or using a reverse proxy rule to define an HTTP route). When the HTTPS request is received by the web server, some embodiments may look-up or assign a session ID to that browser session, save that session into the shared database, then issue an HTTP GET request with a parameter equal to the encrypted HTTPS session ID. The HTTP endpoint may then take the session ID parameter and use it to look-up that session in the database. Finally, the HTTP endpoint may redirect back to the HTTPS request that triggered the initial redirect and the HTTPS→HTTP→HTTPS redirect cycle will be complete.

Figure 7:
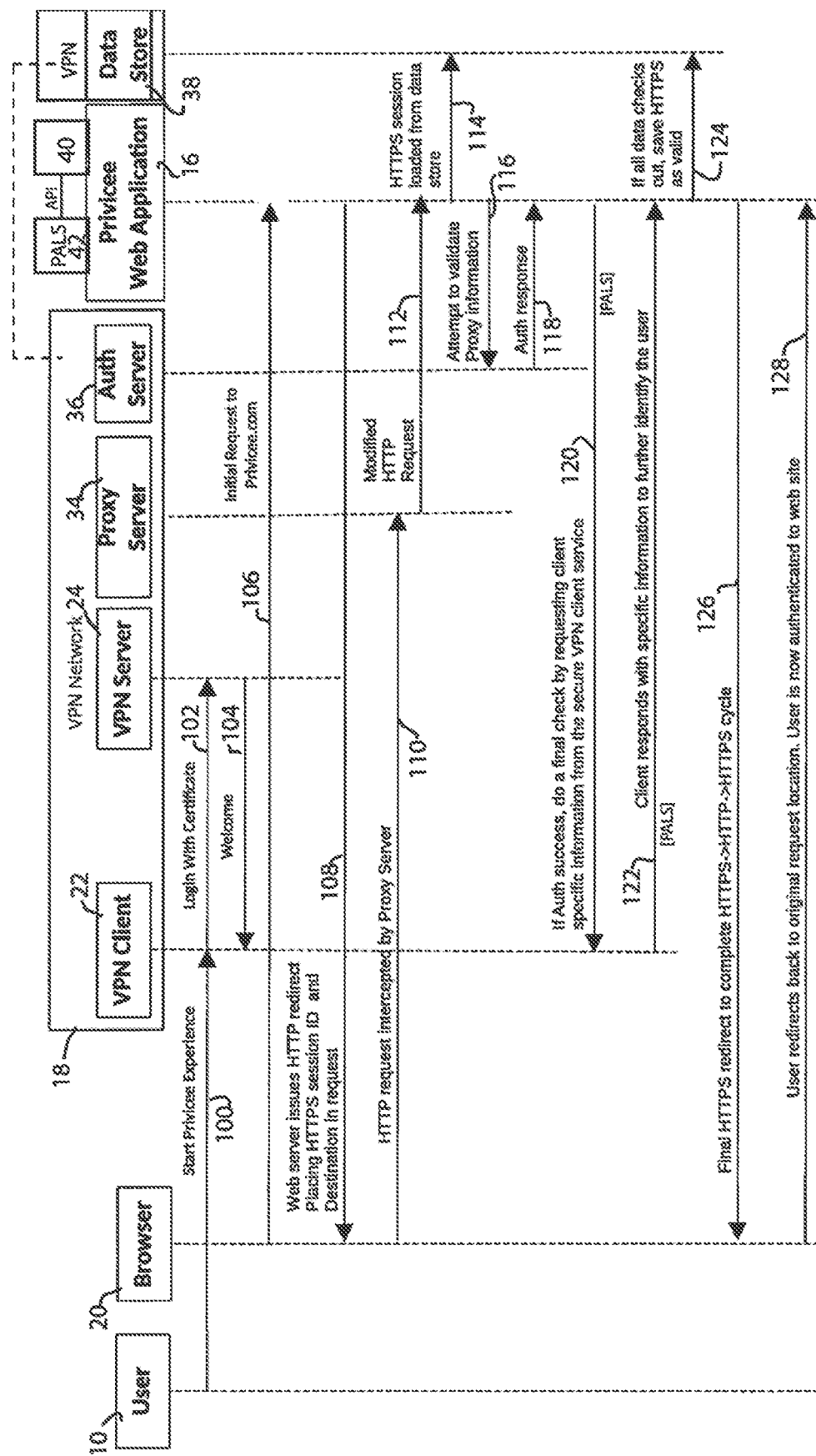
FIG. 7 is a simplified sequence diagram giving an overview of the validation process implemented by the secure internet access system in some embodiments.

In some embodiments, a user's client machine is automatically authenticated to an external web resource, such as a website or web application (which is not to imply that a web application cannot include a website), while using the VPN, e.g., while communicating with the website via the VPN, like exclusively via the VPN. An example of such a process is illustrated in FIG. 7.

In some embodiments, the process begins with the user starting the VPN client software 22 on their client machine 12 and connecting the client machine 12 to the VPN network 18, as shown in block 100. As part of the authentication process the VPN client 22 may log into the VPN server 24 at step 102, e.g., using the unique certificate provided to the user and assigned uniquely to the user's particular client machine 12. After authenticating the certificate, the VPN server 24 may issue a welcome message to the VPN client at step 104. After this point, selected internet bound traffic may be sent encrypted to the VPN server 24 before being forwarded to the desired web resource within the website 16, which may be a private, secure website. As illustrated in FIG. 7, in some embodiments, the private, secure website 16 includes a PALS computer system 42 as well web applications and content server 40. Of course, as noted above, the PALS functionality can also be supplied by a separate PALS server residing on a different network from the web applications and content server 40, which is not to imply that any other set of modules must be co-located, or that all embodiments include the PALS functionality.

Next, the client machine 12, using its web browser 20, makes a first request to a private, secure website or web application 16, at step 106. At this point, although the user has been authenticated to the VPN network 18, the user has not yet been authenticated to use the website 16. At this stage in the process, in some embodiments and use cases, the following conditions are present:
1. No proxy is involved in the HTTPS request; and
2. The website's server creates or locates user session data.

Next, in some embodiments, the web server triggers an HTTPS→HTTP→HTTPS redirect system as at step 108. The HTTP request from the user's browser 20 is intercepted by proxy server 34, as at 110. In some embodiments, the proxy server 34 modifies the HTTP request, which is then forwarded to the web server at 112. The HTTPS session may be loaded from the data store 38 as at 114 (data store 38 may be part of VPN 18) and an attempt may be made to validate the proxy information by accessing the authentication server 36, as at 116. In some embodiments, the authentication server responds at 118, and if authentication was successful, the website or web application 16 may respond to the VPN client 22, as at 120, (e.g., utilizing the PALS functionality) performing a final check whereby client-specific information is requested from the secure VPN client 22.

In response, in some embodiments, the client supplies the specific information to further identify the user to the website or web application 16, as at 122 (in some cases also invoking the PALS functionality). Assuming the supplied information matches identifying information stored in memory, the data may be saved as valid in the data store at 124. At this point the web site or web application 16 may issue a final HTTPS redirect to complete the HTTPS→HTTP→HTTPS cycle, as indicated at 126. Thereafter, the network communications from the user's client machine may be redirected back to the original request location as at 128. At this stage however, in some embodiments, the client machine is now authenticated to the web site or web application. If desired, client machine the web server can place a client cookie into the user's browser (or other forms of client-side storage) and recall this value to determine that the user has been authenticated and does not need to take redirect action while cookie is present.

FIGS. 8-12 depict a more detailed example of the PALS authentication process.

Figure 8:
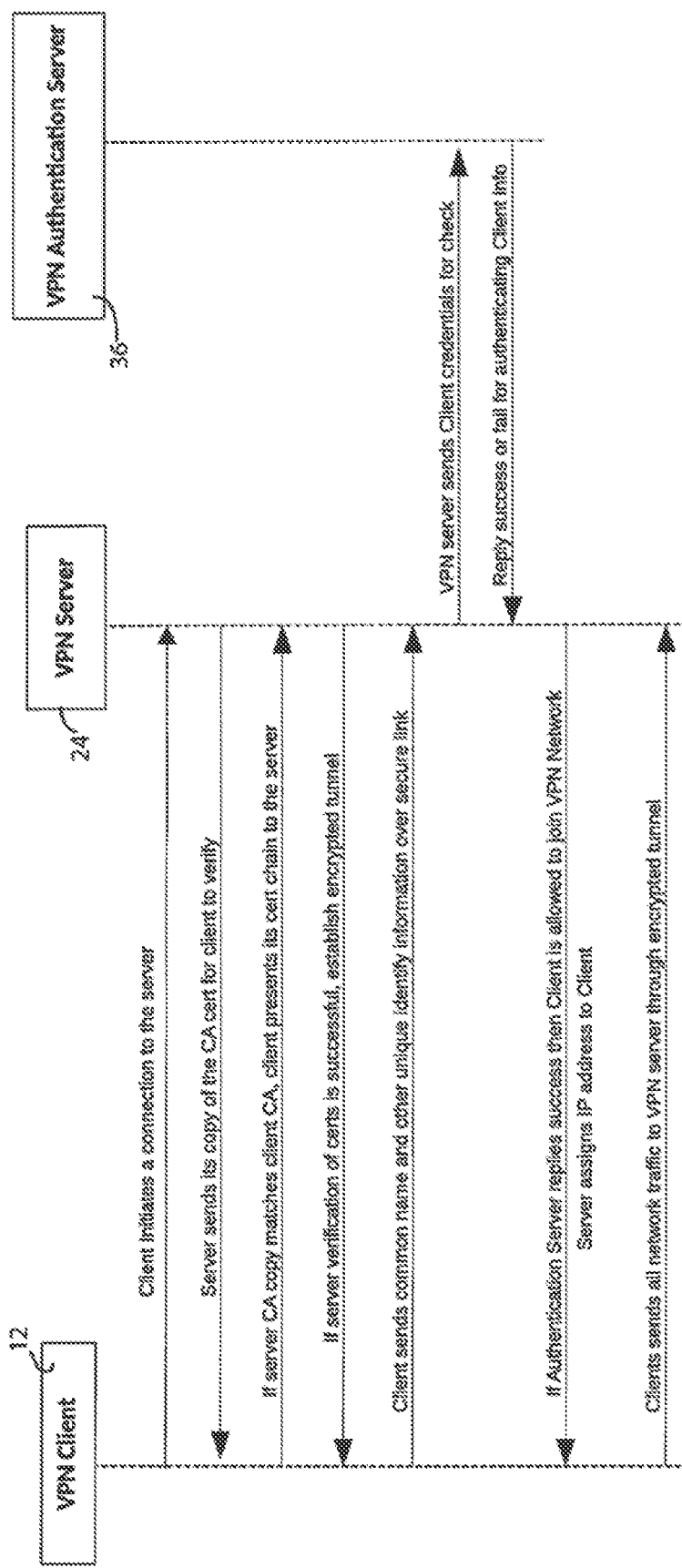
FIG. 8 is a sequence diagram describing in detail the virtual private network (VPN) connection procedure in some embodiments.

FIG. 8 describes an example of a process by which a user is connected and authenticated to the VPN. After this process is completed, in some embodiments, a user has been assigned a unique IP address from the VPN server for use on the internal network (VPN). At this point a user's VPN common name may be placed into a database with the user's corresponding internal IP address. This is an example of the above-described the user unique information.

Figure 9:
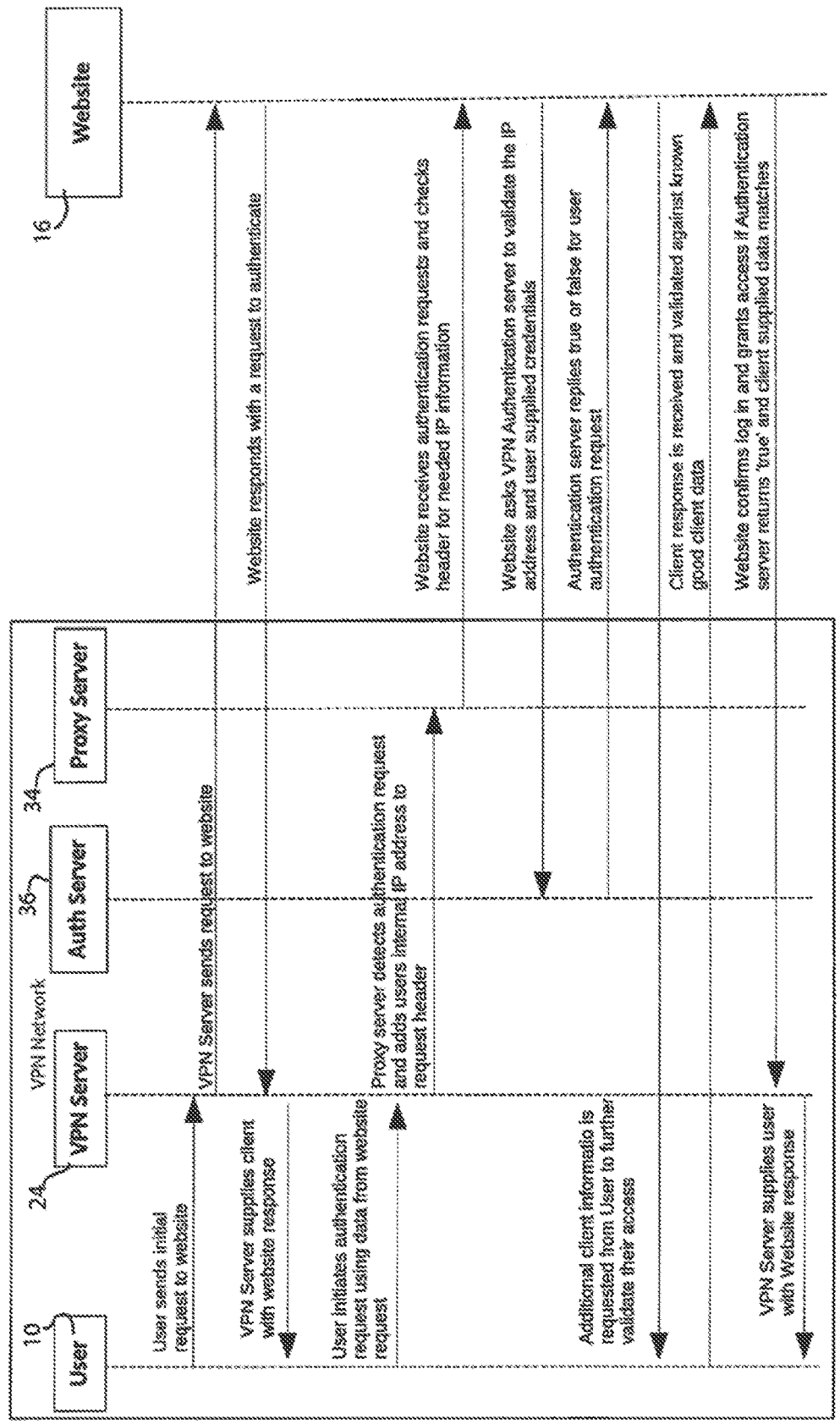
FIG. 9 is a sequence diagram describing in detail the initial client web resource request procedure in some embodiments.
Figure 10:
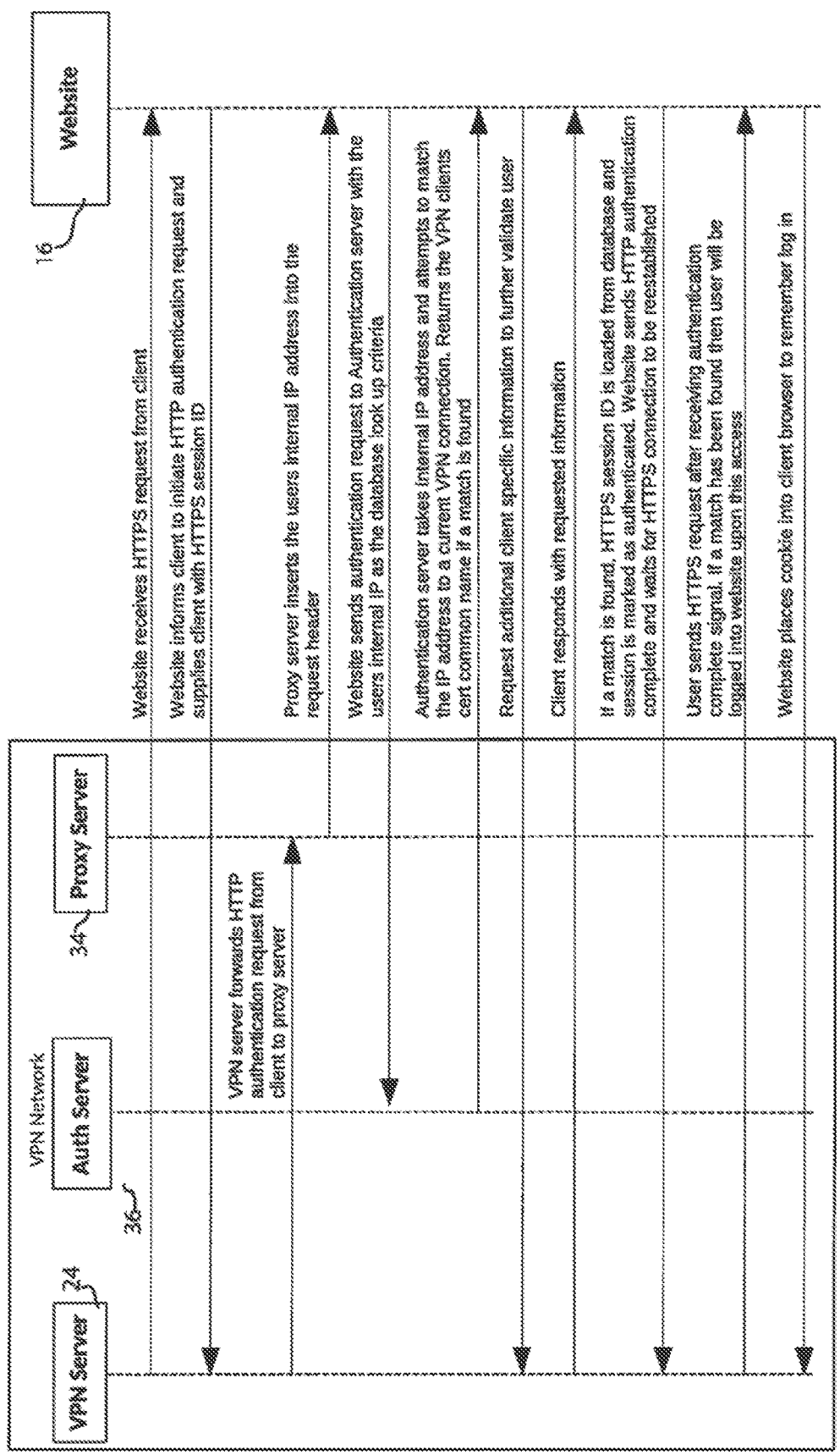
FIG. 10 is a sequence diagram depicting the client authentication request procedure in some embodiments.
Figure 11:
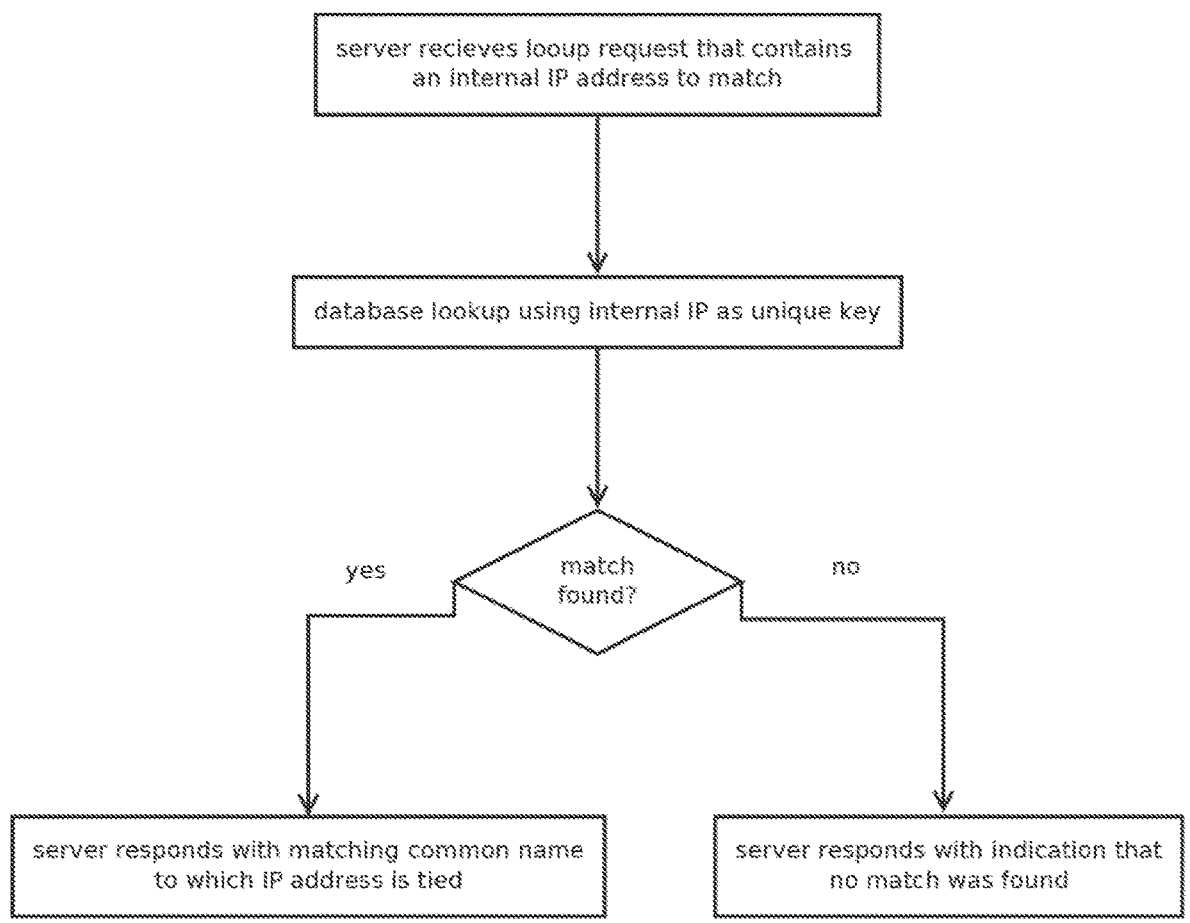
FIG. 11 is a flowchart diagram illustrating how server lookups are performed in some embodiments.

FIG. 9 describes an example of a process by which the VPN infrastructure interacts with an external website, for instance, when a user first accesses the website. In some embodiments, this initial access by the client to the web site initiates the PALS system. A more detailed diagram regarding the HTTP authentication request initiated by the web site is shown in FIG. 10. Additionally, FIG. 11 shows a process performed by the authentication server 36 responsive to an authentication request from the web site. After this process is completed, in some embodiments, a user will be authenticated to the web site assuming all information matches.

Figure 12:
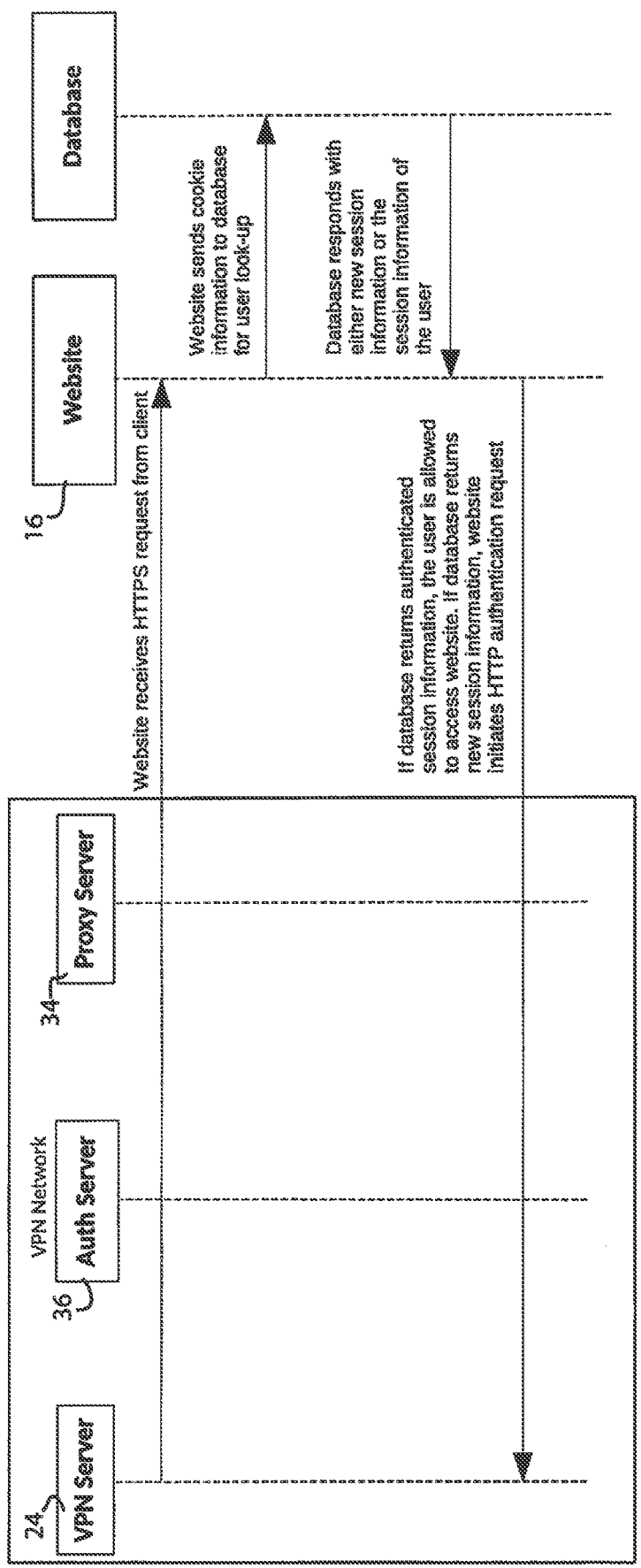
FIG. 12 is a sequence diagram showing how client communication with private, secure website is performed after authentication has been effected in some embodiments.
Figure 13:
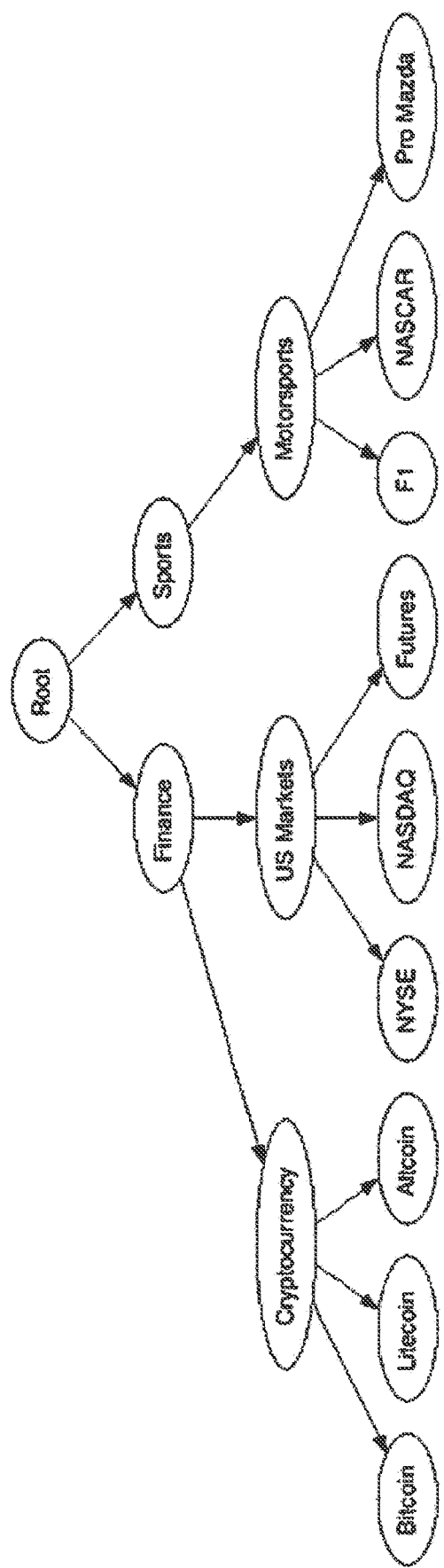
FIG. 13 is an exemplary classification tree, useful in understanding the transparent user neural aggregator system in some embodiments.

FIG. 12 describes an example of a communication process between an already authorized client and the web site. After a user has been through the PALS process, in some embodiments, a browser-based cookie (or other client-side storage, like browser-accessible features such as localStorage) may be used to maintain a record of the user. In some embodiments, the database may return a new session if (e.g., in response to a determination that) the user has logged out, the user has removed the browser cookie, or the user's data is missing from the session database.

The PALS system may be built from industry standard technology utilized in a new way. With this system, a website may integrate automatic authentication for users on the VPN network. Moreover, some embodiments of this system may be expanded into currently implemented VPN infrastructures to obtain a seamless user authentication for internal or external web resources.

This level of control to a web site is expected to allow the secure platform to be relatively selective in connecting users. In some cases, access to certain areas can be ultimately controlled and user actions can be tracked at the relatively low levels.

As noted by the above-description of AMBR, some embodiments may autonomously identify and isolate security breaches and potentially malicious behavior on a network or within the network's associated applications. Some embodiments include an intrusion detection system capable of identifying when a user is acting in a new way and immediately (e.g., within ten milliseconds, within one second, or within one minute) requiring authorization from that user before permitting additional network access.

Some embodiments are device aware such that AMBR may require different authorization methods depending on the type of device in question. In some cases, AMBR uses a hybrid model of both supervised and unsupervised machine learning. AMBR may protect users from other users with a malicious intent, rather than merely protection from certain malware, as is done in some conventional systems (which is not to suggest that the present techniques may not be used in conjunction with traditional antivirus products, or that all embodiments provide this benefit, as multiple, independently useful inventions are described).

AMBR may respond in real time to user interactions, with the capability to issue immediate responses to potential malicious users. In some embodiments, AMBFR includes three components that operate together to collect, analyze, and report on network user (e.g., all users) activities.

In some cases, AMBR includes a data collection module, which collects and organizes the information by which some embodiments make informed decisions regarding the actions or behaviors of a user. The module may be capable of taking in a range of different data points, organizing the data into a manner that is consumable and storing in an easy accessible central location.

Data fed into the system may be in the form of connection IP address, connection time stamps, website accesses, data entered into a form, date entered into an application, or anywhere else the user is interacting with a website or other user. These different data types may be aggregated into a single data format allowing for relatively easy consumption by software processes.

Some embodiments may include an aggregation module configured to take formatted data and aggregate the information in a single series of factors, such as features formatted for ingest by a trained machine-learning model. Examples include the output of an average function (or other measure of central tendency, like mode or median), IP lookup, outputs of a Bayesian filter, self-organizing map, decision tree, and various forms of natural-language processing classifiers, like sentiment analysis.

Aspects of the aggregation module may operate like a 'reduce' function in a Map/Reduce pattern, though unlike some forms of Map/Reduce frameworks, some embodiments are real-time. Various distributed complex event processing frameworks (like Apache Flink, and Apache Storm) may concurrently analyze data in a data analysis pipeline, in real time, in some embodiments operating at larger scales with relatively granular and high volume data.

The results may be compared to criteria of interpreting the data. Each function may serve as a check for a certain situation. Some examples include checking where a user is connecting from, checking if the user is using a different browser, following the user to see if they access sites that are uncommon or never used, and finally identifying the users typing habits and comparing to a known set. This type of platform is expected to allow for a general understanding of a user and is only limited by a programmer's ability to analyze the data. In some cases, the result of various functions may be combined, e.g., in a weighted sum, to calculate a risk score, which may be compared to a threshold to determine whether to block or permit access.

Some embodiments may include a response generator configured to interpret the output of the aggregation module and determine if a response is necessary. The response generator may be able to trigger various actions, such as warning email, or the user's connection to the system.

With AMBR, in some embodiments, device specific responses may be generated and executed. Allowing a system to take different actions for different device types (laptop verses smart phone, for example) is expected to enhance the extensibility of the AMBR system and prevents predictable actions that could be manipulated by experienced persons, though not all embodiments provide these benefits, as various independently useful inventions are described and embodiments of those other inventions need not be combined with AMBR-like features in all cases.

AMBR is best understood in view of motivating examples.

In one example, four users may be playing an online game with voice chatting ability. A text-to-speech (TTS engine) may be attached to the voice chat audio channel and may transcribe audio in real time. The text-to-speech engine may output the transcribed text to an aggregation module configured to detect profane words, in some cases generating a histogram of each key word, as may be formed by a module referred to as quantitative aggregator that integrates various features over time. In some embodiments, if a user's histogram hits a threshold, the response generator may deem it necessary to ban a user from that portion of the network.

In another example, a user lost their laptop in the airport, and an individual with malicious intent steals the laptop and attempts to reverse-engineer the private, secure network. This will generate many HTTP errors, which could be integrated into an errors/second metric. The response generator may compare this metric to a threshold and determine that, since the device is a laptop and they seem to be doing something to generate HTTP errors, that a lock-out may be necessary until the user successfully completes a two-factor authentication challenge. Thus, different thresholds may be selected and applied based on the device type.

In some embodiments, AMBR may mitigate or neutralize threats throughout some or all layers of the private, secure network, e.g., from application level filtering to lower network accesses. AMBR may act as the 'village watch' in areas where it is impractical or undesirable to have continued human contact.

In some embodiments, AMBR enhances the security platform by adding another layer of supervising that previously had not been easily monitored. Some embodiments of the above system are expected to reduce network costs and keep our users aligned with their mission.

In some embodiments, the TUNA component of the private and secure web server, in response to multiple human-provided inputs, may be capable of relatively accurately understanding a user's likes, dislikes, and patterns of behavior, e.g., for the purpose of building a unique profile of the user. This profile may then be used for a variety of purposes, e.g., to identify non-standard usage patterns or hyper-targeted advertisements.

In some embodiments, by classifying at a relatively detailed level the content that a user sees and interacts with, the system may accurately paint a picture of a user's likes and dislikes. Using this same classification system the system may create and pair specific advertisements that the user would be interested in seeing.

In some embodiments, the TUNA system may create a different ranking for each user that it serves. And the TUNA system may learn temporal patterns, e.g., that Black Friday related content is exceptionally important in late November, and might temporarily rank advertisements in that category higher. A variety of techniques may be used to classify and structure content as a user interacts with the system.

In some embodiments, the TUNA system implements a broad system for classifying information that lies within its content archive. In some cases, the system includes a trained, supervised machine learning model, like a classification tree (such as a trained decision tree). Other examples include trained neural net, like convolution neural net. Some embodiments may include supervised machine learning model configured to recognize temporal pattern, like a recurrent neural net (e.g., a long-short term memory model) or a hidden Markov model. In some cases, an unsupervised machine learning model may be trained on log data and used to classify user and network behavior, e.g., log entries may be represented as vectors and the vectors may be clustered, e.g., with a density based clustering algorithm (like DBSCAN) or k-means clustering, or some embodiments may train a self-organizing map. Some embodiments may bind (assig) content to the respective classifications output by the models.

For example, in some cases, the model may be referred to as content tree that retains all of the properties of a true n-ary tree data-structure: it contains exactly one root note (with no parent node); the remaining nodes all contain exactly one parent node. Or some embodiments may vary the data structure such that nodes may have more than one parent, e.g., in a directed acyclic graph (DAG).

As embodiments traverse "down" such a tree, the nodes may get more specific with regards to a particular topic. An example path on the tree might include Root/Sports/Automotive/NASCAR/Sprint Cup/Dale Jr. Wins NASCAR Sprint cup. In some cases, content may be assigned to classifications by a human curator, or some embodiments may assign content or responses empirically, e.g., by testing responsiveness or subsequent behavior against each class and selecting based on observed behavior.

Content is one type of target of the ranking system. In some embodiments, content articles may be provided to the system through two methods: user-submitted content and content aggregated via RSS feeds licensed or otherwise obtained from content publishers. Once the content is created in the system, it may be is assigned (classified) to one or more tree branches on the aforementioned classification tree. In some embodiments, classification is a manual process, however, or some embodiments may provide automatic classification, e.g., with the empirical techniques noted above. Content examples might include: an article found on a news website, an interesting video on a streaming website or even postings to social media.

In some embodiments, as a user is presented with content, for each piece of content there are a number of contemplated feedback mechanisms for gathering a user's potential appreciation of the given item of content. Some embodiments may divide these into positive and negative feedback indicators. Some examples include:

Positive Indicators
    Article Read—a user reads an article
    Tree Drill—a user intentionally navigates from one place on the content tree to another place
    Search & Read—a user intentionally searches the content database and decides to read an article that was returned from the search
    Surveys—A tie breaking survey to gain additional information (see below)

Negative Indicators
    Trash Can—a user indicates through a graphical user interface (GUI) element that they do not want to be presented with this content
    Article Non-Read—a user is presented with content that they did not read Positive and negative feedback may be represented by or adjusted by a numeric weight. In some embodiments, the feedback weights may vary. Feedback weighing may be the product of a function that incorporates parameters such as: feedback history for a given user, temporal awareness, other user's feedback history for a given article or branch, etc. Lastly, feedback may be collected in a user's feedback dataset, which may contain a set of tree branches that contained ranked content and the corresponding net rank.

Based on the ranking, some embodiments may deliver an ordered list of content that applies to a specific user based on that user's feedback scores. The input for this process may include the classification tree [T] (or other trained classifier), a given users feedback dataset [D] that is projected over (e.g., classified by) [T], and a lambda function to provide scores to branches without known scores [λs]. The technique is best understood in view of illustrative examples, e.g., with the following inputs:
User's Feedback Dataset [D]

```
var D = [
    {branchId: "Root->Finance->Cryptocurrency->Bitcoin", score: 20},
    {branchId: "Root->Finance->US Markets->NYSE", score: 5.0},
    {branchId: "Root->Sports->Motorsports->F1", score: 10},
]
```

In one example, λs may be parameterizied to accept the following:
r=score of the highest ranked nearest neighbor
d=distance from new content to r
In this example, the base b of the log function may be relatively constant and may be used to control normalization of the function output.

Using the above parameters T, D and λs(r,d), if an article were to come in and be classified to the NASDAQ branch of [T], its content score would be λs(5,2)=5*[1/log(2+1)] =4.55. It is important to note that the above functions and parameters (including ranking function) serve as examples, and in some embodiments can be changed on-the-fly.

In this example, the resultant dataset [RR] for the two requested branches (in this example NASDAQ and Litecoin) might be represented as follows:

```
var RR = [
{branchId: "Root->Finance->US Markets->NASDAQ", score: 4.55},
{branchId: "Root->Finance->Cryptocurrency->Litecoin", score: 18.204},
]
```

This data may be projected back over [T] and in a method similar to the initial dataset [D], and may be used to apply scores in areas of the classification tree where user provided scores do not exist.

In some use cases, the system might create a set of scores that are relatively highly ranked, but indistinguishably close. In this case, in some embodiments, the system may respond by presenting the user with a survey. This survey may include questions such as "Are you still interested in Porsches?" or "Do you want to continue receiving updates about Politics?" For more complex scenarios, the system may present a different type of survey such as "How would you rate your interest in Samsung Electronics [1-10]?" The answers provided by these surveys may be used to drive an adjustment to add clarity and precision to a user's content stream. For instance, various weights in the above-described models may be adjusted, or different content may be mapped to different outputs.

Some embodiments may target vendor advertising to certain users. This can be automated by injecting into the content stream relevant products or other marketable services to the user or by manually placing product placements on to certain tree-branches for certain weight thresholds. One example might be an individual who has an affinity for Samsung Galaxy mobile devices. Some embodiments of the classification tree may be relatively specific and include such a designation. In response to an ongoing co-branding campaign, the merchant Best Buy may want to advertise to users who have a score of, for example, greater than 40 (assuming that 40 is a relatively high score) on the Samsung branch. Additionally, using the created profile in conjunction with user surveys, some embodiments may determine whether a user, for example, thinks heli-skiing is something they would like to do or just something they wanted to learn more about. In the case of the former, some embodiments may connect them with a merchant that would offer a commission payment for lead generation or trip bookings.

The TUNA system, in some embodiments, may continually ensure (or make more likely) that a user is being exposed to relevant content. Additionally, some embodiments learn with additional user interactions about how users think and behave. This allows some embodiments to take content and data in multiple formats and aggregate it into a usable, continual stream of information. Lastly, this method can be applied to other ranking implementations like shopping. That said, not all embodiments provide these benefits, as multiple, independently useful inventions are described, and the various inventions have different use cases.

For example, modeling a user's likes, dislikes, and other patterns is expected to allow embodiments to control and govern the use of private sites. Connecting known users, in a known way, prevents unknown online intrusion and protects a sense of community and security. Anomalous behavior may be detected by the above described models, e.g., in response to a user deviating from previous patterns and generating more than a threshold number of vectors falling outside of a cluster or more than threshold number of acts different from those predicted by a hidden Markov model or recurrent neural net. In response, a user's access to the network may be flagged for administrative review, limited, or terminated.

Figure 14:
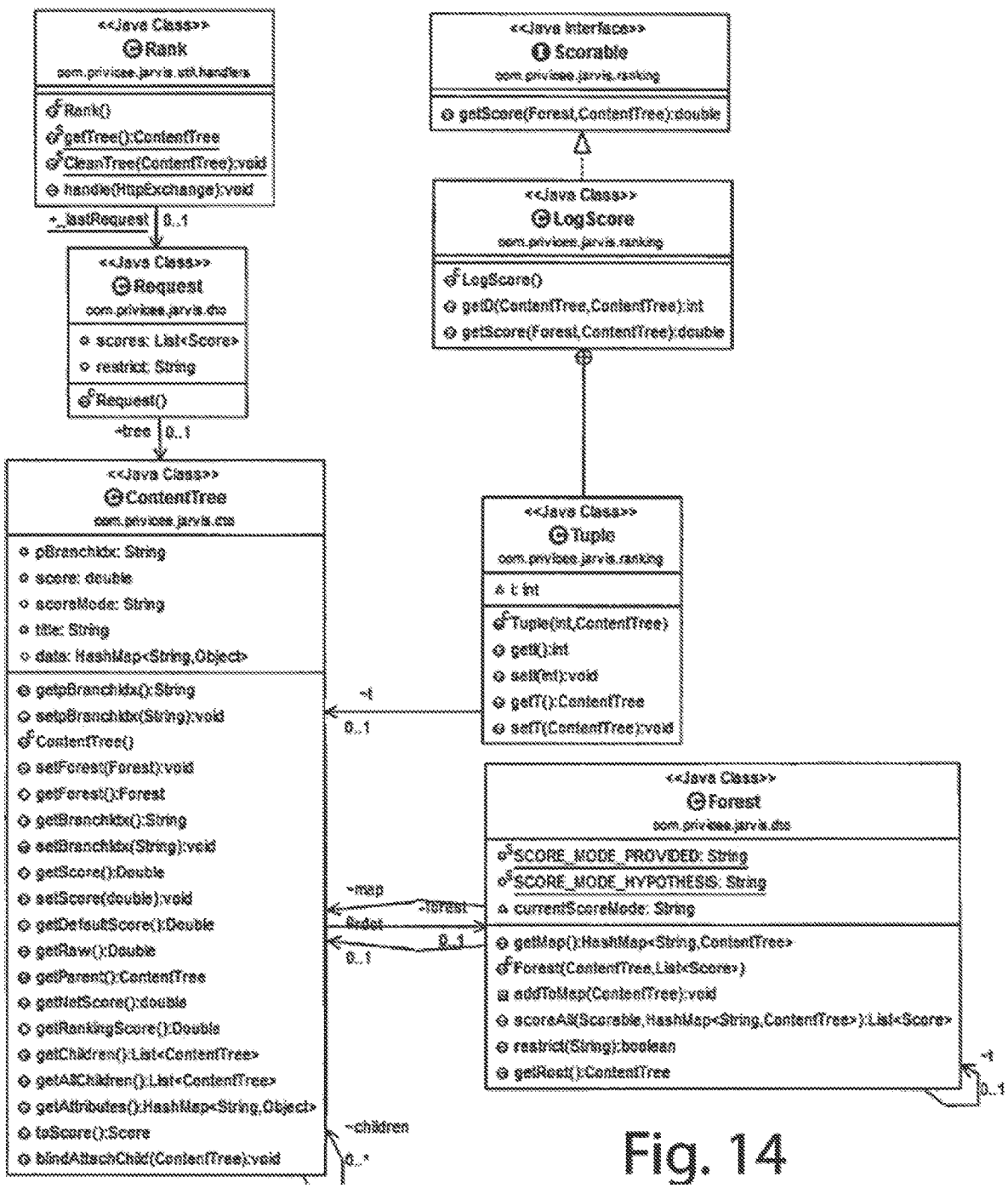
FIG. 14 is a class diagram showing components of a content system in some embodiments.
Figure 15:
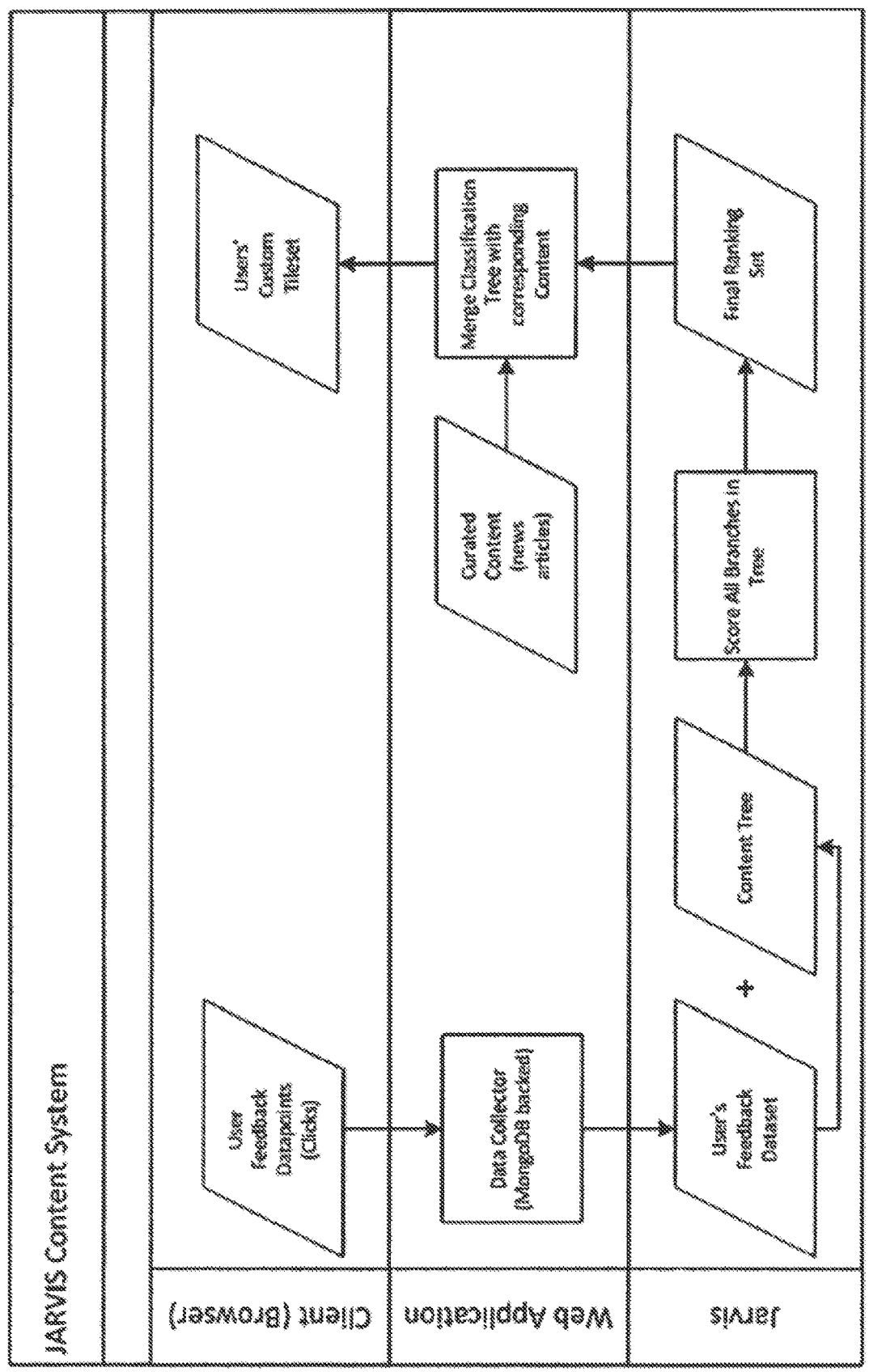
FIG. 15 is a data flow diagram illustrating how data flows through the content ecosystem in some embodiments.

FIG. 14 shows the architecture of the certain components of an example content system formed in an object oriented programming environment, and FIG. 15 shows an example of how data flows through some embodiments of the content ecosystem. As shown in FIG. 14, the system includes various classes serving various roles.

Some embodiments include a Java class referred to as "Forest." In some cases, the Forest class is one of the components used to represent data. It may contain the base of the tree as well as a hashmap used to directly access any 'node' on the tree, e.g., in O(1) time. The Forest may also contain a method scoreAll that accepts an object that implements the Scorable interface, which will provide scores.

Some embodiments include a Java class referred to as "ContentTree." In some embodiments, the ContentTree class represents a 'node' on the tree. In some cases, all 'nodes' contain a branchIdx field and a pBranchIdx field, and these represents a unique key to this branch and its parent respectively. These keys may be dereferenced using the map member of the Forest' in which the given ContentTree resides. It may contain a (direct or indirect) reference to its parent and a list of its children. Additionally there are a set of getter/setter methods for various score types, in some embodiments.

Some embodiments include a Java class referred to as "Scorable." In some embodiments, the Scorable interface scores inputs, such that scoring functions can relatively easily be swapped in and out for design and testing purposes. A class that implements the Scorable interface may implement one function getScore that accepts a Forest and a specific ContentTree node belonging to that forest and returns a score Some embodiments include a Java class referred to as "LogScore." In some embodiments, the LogScore (logarithmic score) is a specific implementation of the Scorable interface similar to the algorithm presented above.

Some embodiments include a Java class referred to as "Tuple." In some embodiments, Tuple is a container used by LogScore to hold the relationship between a ContentTree node and a score before scores are applied to the nodes.

Some embodiments include a Java class referred to as "Rank." In some embodiments, "Rank" is an HTTP interface configured to handle requests on a particular path, like "http://jarvis/rank."

Some embodiments include a Java class referred to as "Request." In some embodiments, Request is an object representative of deserialized JavaScript object notation (JSON) coming from the Rank HTTP request containing a specific users' feedback data As shown in FIG. 15, user feedback, entered through the browser and submitted to the web application, may be captured by the data collector. The data collector may then store its collected data as part of the user's feedback data set in the content system, which may be referred to as the Jarvis content system. This user feedback data may be concatenated with data from the content tree that may be used to score all branches in the tree to arrive at a final ranking set.

In some embodiments, curated content, such as news articles, may be merged within the web application into the classification tree and this may be fed to the user's browser as custom information (e.g., custom tileset) for that particular user.

In this way, user feedback can also be used as reference data for an automated malicious behavior detection (AMBR) system.

One class of examples of such a use are based on the user's keyboard, mouse, GUI, and other input habits. In some embodiments, feedback may be characterized as part of a high-dimensional time-series signature, including web page navigation techniques, typing speed, keyboard shortcuts, and specialty mouse movements. Additionally, other information may be collected and analyzed directly from human interface devices (HIDs) such as touch screens or computer terminals. The above-described models may be trained on such inputs and configured to classify the data feed as anomalous, non-anomalous, or undesirable.

This use of user feedback as a reference data source feed to the AMBR system may be applied by modeling the data flow sequence into the AMBR stages of: data collection tasks, the aggregation tasks (measuring the time between events) and the responsive tasks. The technique is best understood in view of examples.

In a first example, user A uses a Mac OSX machine. An apple-script is mimicking User A's behavior at night to gain access to User A's bank account. To do this, the script is running a macro to open the web browser (Safari), navigating to Wells Fargo and trying every password found on User A's computer.

The AMBR system, in some embodiments, may detect the following and prevent the script from gaining access: 1) The script launched Safari, which user A uses with less than a threshold frequency because he's a strong advocate of a different browser; and 2) The script is mimicking keystrokes at greater than a threshold difference (e.g., more than five standard deviations greater than a mean) from a user's past typing rate. Lastly, the system may determine that User A has never been to Wells Fargo before because User A banks at Chase or based on a comparison to a list of previously visited URLs. In response to detecting that one or both of these thresholds have been exceeded and a new website has been accessed, some embodiments may determine that user A's client machine has been compromised.

Once the system has noticed the anomaly, in some embodiments, in response, the system may issue the end user additional authentication challenges to verify the user's identity.

In a second example, user B uses an iPad. Embodiments may sense this pattern of behavior (e.g., based on parameters in a user agent string in HTTP requests) and log it, along with the speed, force, and style of his typing, the orientation in which he typically uses his iPad, along with his inclination to use—or not use—shortcuts on the tablet (e.g., pinching to zoom, double-clicking the home button to launch multitasking, using Siri, etc.), certain preferences like his tendency to close out multitasked apps versus leaving them open, or turning on or off Bluetooth to save battery life, and the locations from which user B typically uses his iPad.

If an unauthorized third party gained access to User B's tablet, the tablet may emit a stream of data indicative of behavior, and the AMBR system may determine that this stream of data does not match previous patterns. In response, some embodiments of AMBR may prevent the user from continuing to use the device or have network access. Examples of mismatches detected may include the following: 1) The new user has significantly different tablet behavior than user B (e.g., more forceful typing, faster/slower typing, pinching to zoom on websites where user B normally does not do so, etc.); 2) The user holds the tablet at a significantly different orientation than user B and doe not multitask between apps, whereas user B uses multitasking relatively often. A combination of these mismatches, coupled with the fact that the iPad is being accessed from an unknown location, may be determined to indicate unauthorized access.

Some embodiments of process may be applied to determine various forms of unauthorized access, e.g., whether an AppleScript has gone rogue, physical access to a machine has been compromised, or in a myriad of other cases. Some embodiments of AMBR may detect variances in the data from what it would consider to be 'normal' and ask the user to authenticate to the system.

Figure 16:
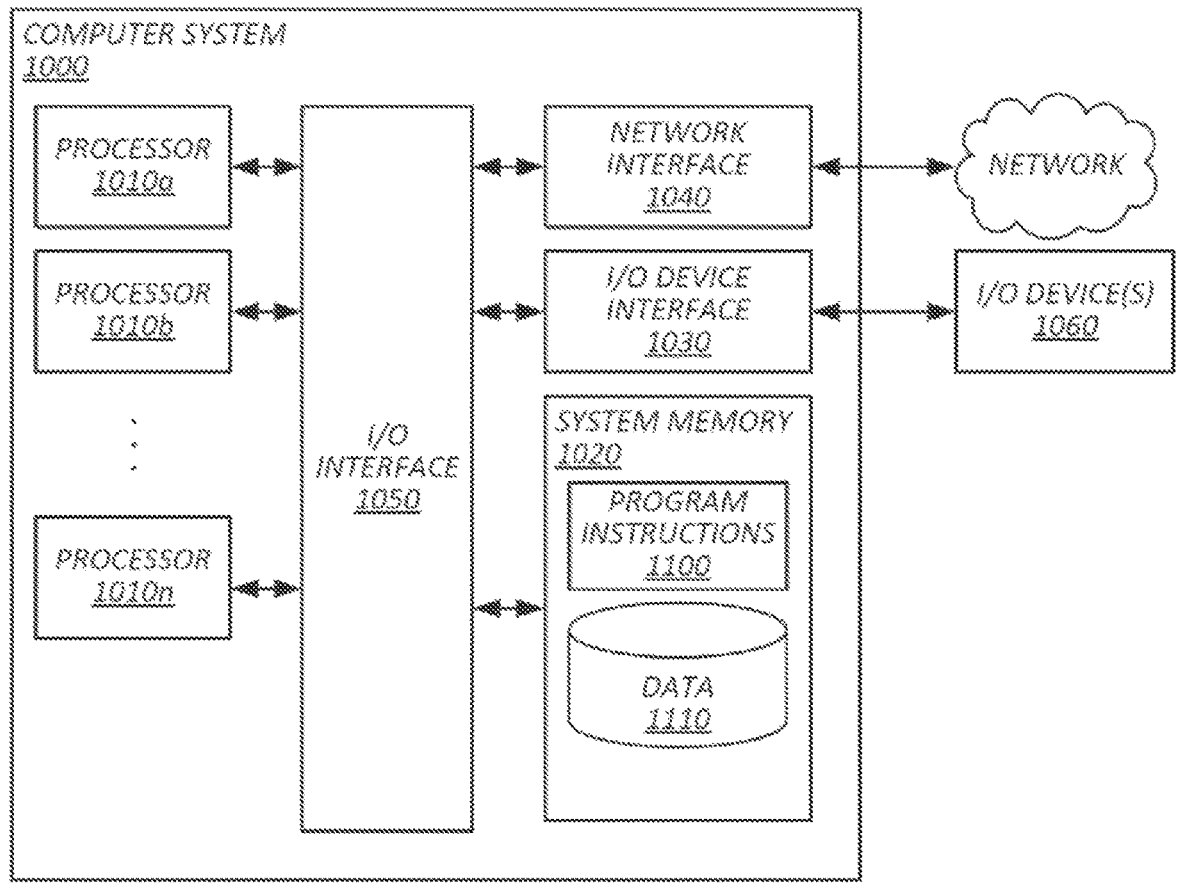
FIG. 16 is an example of a computer system by which components of the above systems may be implemented While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

FIG. 16 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

What is claimed is:

1. A method of authenticating a user, the method comprising:
   obtaining, with one or more processors, a log of user interactions with one or more client computing devices;
   training, with one or more processors, an anomaly detection model based on the log of user interactions;
   after training the anomaly detection model, with one or more processors, receiving a stream of events indicating user interactions with a given client computing device;
   classifying, with one or more processors, the stream of events as indicating anomalous behavior based on the trained anomaly detection model; and
   in response to the classification, adjusting, with one or more processors, network access privileges of the given client computing device, wherein:
      training the anomaly detection model comprises:
         determining candidate parameter values of the anomaly detection model;
         comparing predictions of the anomaly detection model based on the candidate parameters to the log data to determine a measure of mismatch; and
         adjusting the candidate parameters based on the measure of mismatch to reduce an amount of the mismatch;
      classifying the stream of events as indicating anomalous behavior based on the trained anomaly detection model comprises determining a risk score and comparing the risk score to a threshold;
      adjusting network access privileges of the given client computing device comprises:
         sending a command to the given client computing device configured to cause the given client computing device to prompt the user for a credential value;
         receiving the credentials from the given client computing device; and
         determining that the credential value is incorrect and, in response, terminating network access to the given client computing device to at least some resources; and
      classifying the stream of events as indicating anomalous behavior based on the trained anomaly detection model comprises comparing received events to predictions of time-series machine learning model.

2. The method of claim 1, wherein classifying the stream of events as indicating anomalous behavior based on the trained anomaly detection model comprises performing steps for monitoring user interaction with computer resources to detect malicious or inappropriate user behavior.

3. The method of claim 1, wherein
the time-series machine learning model comprises a hidden Marhov Markov model.

4. The method of claim 1, wherein the time-series machine learning model comprises a recurrent neural net.

5. The method of claim 1, wherein the time-series machine learning model comprises a long-short term memory (LSTM) model.

6. The method of claim 1, wherein the time-series machine learning model comprises a trained decision tree.

7. The method of claim 1, wherein the time-series machine learning model comprises a convolution neural net.

8. The method of claim 1, wherein the time-series machine learning model comprises an unsupervised machine learning model.

9. The method of claim 1, wherein the time-series machine learning model comprises a clustering model.

10. The method of claim 1, wherein the time-series machine learning model comprises a density based clustering model.

11. A tangible, non-transitory, machine-readable medium storing instructions that when executed by one or more processors effectuate operations comprising:
   obtaining, with one or more processors, a log of user interactions with one or more client computing devices;
   training, with one or more processors, an anomaly detection model based on the log of user interactions;
   after training the anomaly detection model, with one or more processors, receiving a stream of events indicating user interactions with a given client computing device;
   classifying, with one or more processors, the stream of events as indicating anomalous behavior based on the trained anomaly detection model; and
   in response to the classification, adjusting, with one or more processors, network access privileges of the given client computing device, wherein:
      training the anomaly detection model comprises:
         determining candidate parameter values of the anomaly detection model;
         comparing predictions of the anomaly detection model based on the candidate parameters to the log data to determine a measure of mismatch; and
         adjusting the candidate parameters based on the measure of mismatch to reduce an amount of the mismatch;
      classifying the stream of events as indicating anomalous behavior based on the trained anomaly detection model comprises determining a risk score and comparing the risk score to a threshold;
adjusting network access privileges of the given client computing device comprises:
sending a command to the given client computing device configured to cause the given client computing device to prompt the user for a credential value;
receiving the credentials from the given client computing device; and
determining that the credential value is incorrect and, in response, terminating network access to the given client computing device to at least some resources; and
classifying the stream of events as indicating anomalous behavior based on the trained anomaly detection model comprises comparing received events to predictions of time-series machine learning model.

12. The medium of claim 11, wherein classifying the stream of events as indicating anomalous behavior based on the trained anomaly detection model comprises performing steps for monitoring user interaction with computer resources to detect malicious or inappropriate user behavior.

13. The medium of claim 11, the time-series machine learning model comprises a hidden Markov model.

14. The medium of claim 11, wherein the time-series machine learning model comprises a recurrent neural net.

15. The medium of claim 11, wherein the time-series machine learning model comprises a long-short term memory (LSTM) model.

16. The medium of claim 11, wherein the time-series machine learning model comprises a trained decision tree.

17. The medium of claim 11, wherein the time-series machine learning model comprises a convolution neural net.

18. The medium of claim 11, wherein the time-series machine learning model comprises an unsupervised machine learning model.

19. The medium of claim 11, wherein the time-series machine learning model comprises a clustering model.

20. The medium of claim 11, wherein the time-series machine learning model comprises a density based clustering model.

* * * * *